2,920,127
ALKALINE ACCUMULATOR
Hans Vogt, Erlau, near Passau, Germany
Application July 18, 1955, Serial No. 522,614
Claims priority, application Germany July 19, 1954
4 Claims. (Cl. 136—6)

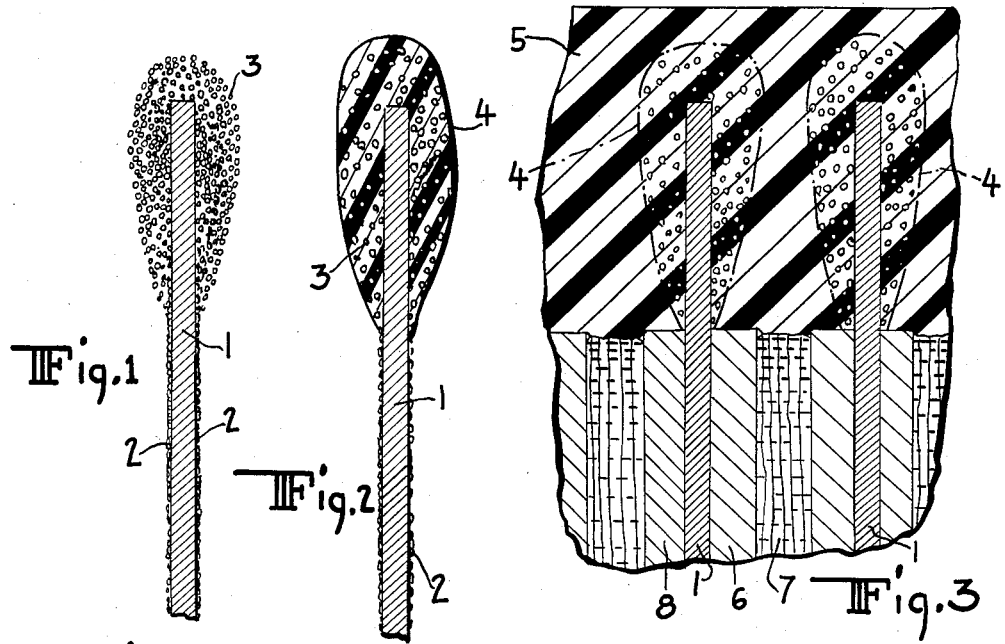
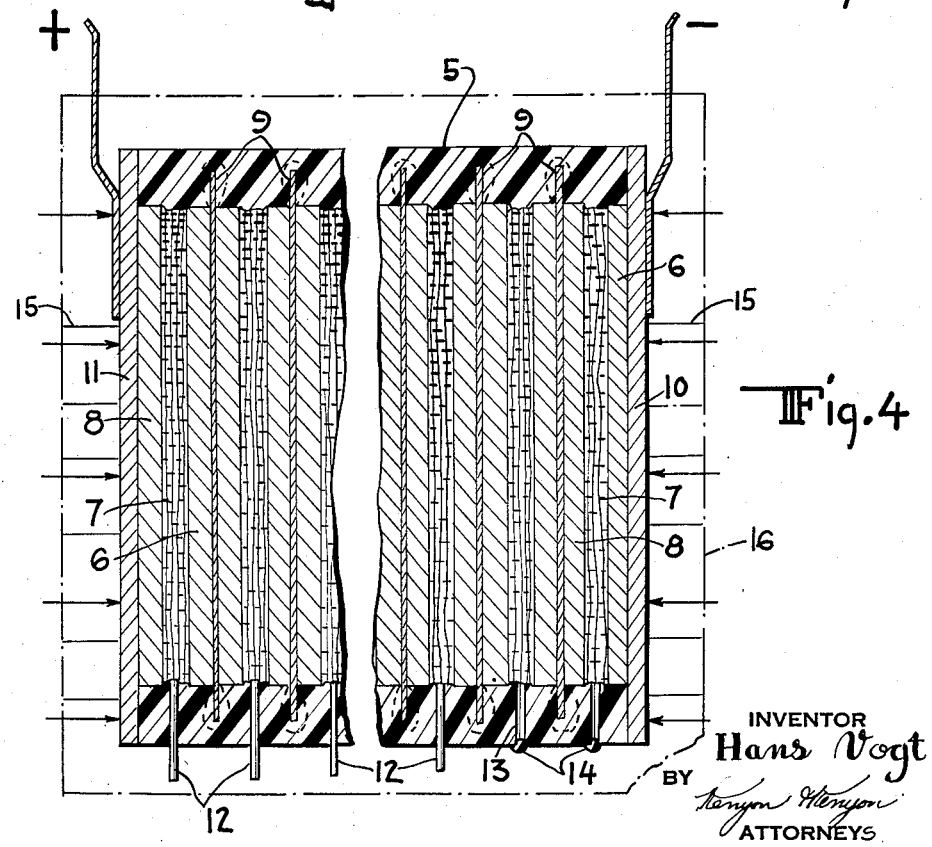

This invention relates to certain improvements in or relating to gas tightly closed multi-cell accumulators or storage batteries and has special reference to alkaline accumulators of the type in which the electrodes are arranged in a tightly compacted unit of flat electrodes of opposite polarity, said electrodes including porous carrier skeletons for an active mass, inserted in a casing under surface pressure, the active mass of the electrodes being subdivided to form large surfaces and thin electrodes with interposed separators. The small distance between adjacent electrodes is important in order that the gases (hydrogen and oxygen) produced in case of overcharging and overdischarging pass immediately to the counter electrode and are electrically oxidized or reduced there so quickly that a detrimental formation of gas between adjacent electrode surfaces and a detrimental accumulation of gas in the accumulator casing is avoided even if the same is absolutely tightly closed.

I have found that it is very important, in accumulators of this kind, to provide means which prevent the formation of gas at those surfaces of the electrode pack or coil which do not face an electrode surface of opposite polarity and whose gases, therefore, are not neutralized immediately after their formation.

It is an object of the present invention to provide a tight mechanical connection between the partition walls of the cells and the casing or jar of the multi-cell battery.

Another object of the invention is to provide a simple and reliable electrical connection between the corresponding electrodes of adjacent cells.

Still another object of the invention is to ensure that the edges of the electrodes cannot participate in the development of gas in the tightly closed accumulator casing.

With these and further objects in view, according to the present invention contact sheets of metallic material are sandwiched between the adjacent electrodes of different cells, said contact sheets projecting on all sides from the electrodes and forming the partition walls between the cells, the projecting portions being roughened and provided with a coating of synthetic material which is embedded in, and forms an intimate structural combination with, the outer casing of the accumulator. Preferably a metallic powder material is applied on the projecting portions by sintering so as to produce a rough surface.

The synthetic coating material should be non-permeable to ions and gas and may be of the group consisting of ethoxyline and epoxide resin.

By a construction of the accumulator according to the invention it is ensured that a tight and pressure-resistant connection between the contact sheets and the outer casing of the accumulator is obtained, whereby it is also possible to provide a tight engagement between the edges of the electrodes and the casing, with the result that an undesirable development of gas at such edges is prevented.

The accumulator casing formed by the synthetic resin according to the invention may be a single or multi-cell accumulator in the form of a block-like constructional unit, or it may be a multi-cell accumulator in which the single cells are formed by telescoped cylindrical cell chambers with tightly compacted electrode coils, while the artificial resin layer forms the cover and/or bottom of the casing, which cover or bottom is common to all of the cylindrical chambers of an accumulator. The artificial resin layer thus may close the tightly packed electrode block or coil at least on the end faces formed by the layers in connection with an additional casing or with constructional parts forming the casing, e.g. electrode pack press plates, cell sleeves or the like, or the whole casing of the electrode coil or pack may be formed by the synthetic layer enclosing the coil or pack in the form of a tight accumulator or cell casing.

The separating wall between adjacent cells on all sides projects beyond the electrodes belonging to this wall and forms a tight cell casing with its two adjacent separating walls by filling in the recesses formed by the cut surfaces of the electrodes disposed between the separating walls. Also for this filling-in operation to form a casing the ethoxyline resin or epoxide resin is very suitable on account of its favorable properties. These resins may be applied on the electrode pack or coil to be tightly closed or on certain surfaces thereof, in the form of successive layers.

Said ethoxyline and epoxide resins are very suitable for the solidification and complete sealing of the cell chambers of multi-cell accumulators which are filled with electrolyte, and more particularly, with an alkaline electrolyte. Especially those artificial resins have an extremely high adhesion on metals whereby it is simultaneously ensured that no detrimental development of gas is possible on the edges of the electrodes and that the formation of creepage paths between adjacent cells on the connecting points of the partition walls between the cells are excluded. It may be advantageous, in order to obtain an absolutely tight bond between the resin layer and the metallic surface of the partition wall, to provide the partition wall, which projects beyond the active electrode surfaces, with a coating of ethoxyline or epoxide resin before applying the cast resin layer or layers, and this coating may be molten into the surface thereof by heating the edge of the partition wall.

The electrode units are produced by superposing alternate electrodes of different polarity and intermediate separators between the partition walls of the cells which simultaneously form contact plates for the series connection of the cells. The artificial material (ethoxyline or epoxide resin) is cast around the units, which are tightly compacted between metallic end plates in the form of a block, or spread thereon in the form of several layers. Before the casing or spreading operation the block unit is provided with core pins for the formation of channels in the range of each separator layer. These core pins are removed from the solidified artificial resin casing layer and the cells which are tightly closed except for the channels formed by the removal of the core pins are evacuated and then filled with lye. The adjustment of the proper amount of lye is effected by expelling excessive lye from the cell through said channels. To this end the cell is overcharged with a charging voltage provided for the cell in actual service. The correct ratio between the amount of lye and the hollow space left in the cells at a predetermined overcharging can be determined by weighing or by the fact that no further lye is expelled. After said adjustment the channels are tightly sealed with artificial resin, preferably ethoxyline or epoxide resin. In order to increase the pressing effect of the casing or bandage with respect to the compaction of the electrodes, wedges acting in the pressing direction of the pile of electrodes may be driven in. Preferably, in order to maintain the compression effect exerted by the casing, the same may consist of a material with a factor of expansion which is equal to or smaller than the factor of expansion of the material used for the casing; for instance, a cast silumin or aluminum casing or a steel bandage are suitable.

The separators preferably consist of a fabric of synthetic material with very fine electrolyte channels. Perlon fabric and polyamide filter paper obtainable on the market under the trade-name of Rhovyl filter paper, of a thickness of about 0.08–0.1 mm., proved to be very suitable for the construction of tightly packed electrode blocks in gastightly closed accumulators.

It is advantageous to roughen the edges of the partition metal sheets protruding beyond the electrodes and to melt or burn artificial resin, for instance ethoxyline or epoxide resin into the border zone thus formed, before inserting the sheets into the pile. Partition wall and contact metal sheets thus provided with an artificial resin border ensure an irreproachable joint, by applying the artificial resin forming the casing in the form of the solution or melt, which is very important for the absolutely tight separation and closure of the cells combined into a block and for avoiding auxiliary paths for the lye or path of self-discharge. The roughening of the border zones of the partition wall or compact metal sheets may be effected by sintering a metal powder layer on to the sheets. However, any other suitable method for roughening the border zone may be used.

In order to save artificial resin for the formation of the casing and for accelerating the setting thereof, fillers, for instance shale dust, finely pulverized glass or basalt fibres, glass powder or the like may be admixed to the artificial material.

The ethoxyline or epoxide resins used according to the invention and known for instance in Switzerland under the trade name of Araldit also have the important advantage of forming a bond with the metallic partition walls of the cells which is absolutely tight against gas and lye in spite of a relatively high viscosity, without penetrating to any substantial extent into the separator layers inserted between adjacent electrode surfaces of different polarity, which separator layers preferably consist of a finely porous, hygroscopic material, or into the skeleton material of the electrode.

It will thus be understood that the tightly packed electrode pile or coil, in the form of a single-cell or multi-cell block or coil, with or without a common partition wall between adjacent cells, which partition wall is the carrier of an anode of one of the cells and of a cathode of the other cell, is coated, on the lateral or end surfaces formed by the layers, with ethoxyline or epoxide resin, in the manner prescribed for said resin, whereby after the hardening of the resin layer a coating is formed which may also constitute the casing for the cells of the block in connection with the partition walls and possible further constructional parts forming the casing.

Ethoxyline or epoxide resins are known as epichlorhydrin

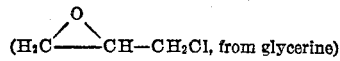
(H₂C———CH—CH₂Cl, from glycerine)

condensed with phenolic compounds such as

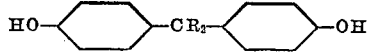

with formation of HCl and splitting up of the "epoxide" ring to long-chained resin molecules containing at both ends reactionable epoxide rings and probably also alcoholic hydroxide groups on the chain. These fusible resins can be cured without pressure in a hot or cold condition by specific addition reactions of the end groups with anhydrides of dibasic acids or with amines. It is a special advantage of these resins when used in connection with the present invention, that their shrinkage on hardening is small, so that the products can be cured free from tension, without tearing. The resins have an excellent adhesion on metals and do not attack the same. Moreover, they have very favorable properties in regard to their electrical insulation and they are resistant to lyes and acids so that they are highly suitable for the formation of coating layers on electrodes or electrode-piles or coils and for the formation of casings of alkaline accumulators. By the present invention a new field of use has been opened for the known cast resins (ethoxyline or epoxide resins) and it has become possible to produce in a favorable manner accumulators which are closed so as to be tight to gas and lye and meet all requirements of practical service. It is an important disclosure of the present invention that said ethoxyline or epoxide resins are also very suitable for forming a tight closure against potash lye on the joints between these resins and metal.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a cross sectional view of a contact sheet roughened on both sides.

Fig. 2 is a similar view showing the contact sheet with its artificial resin coating.

Fig. 3 is a cross sectional view showing two contact sheets embedded in synthetic material forming the casing of the accumulator and Fig. 4 is a cross sectional view showing a multi-cell accumulator of the block type having the invention applied thereto.

Similar reference numerals denote similar parts in the different views.

The contact sheet 1, Fig. 1, consisting of metal and forming a partition wall between two adjacent cells of the accumulator block is roughened on both sides by application of a layer 2 of sintered metal powder which is thickened in the range of the outer border zones. As shown in Fig. 2, the artificial resin, preferably ethoxyline or epoxide resin is molten into the sintered skeleton border zone 3 which by filling up the pores of the skeleton forms a bead of artificial material which is intimately connected with the contact or partition wall sheet 1. The partition walls thus formed with a bead 4 are embedded in the synthetic material 5, Fig. 3, forming the casing of the accumulator block. The artificial resin used for forming the bead 4 and the casing layer 5, preferably ethoxyline or epoxide resin, are harmonized with each other in such a way that the bead 4 forms an intimate bond with the wall 5 of the casing when applying the layers of artificial material forming the casing, in the form of a melt or in the form of a solution.

Fig. 4 shows a multi-cell block accumulator built up with contact sheets acting as partition walls between the cells. The multi-cell block is formed by piling up alternate sets of anodes 6, separators 7, cathodes 8, and sheet metal partition walls 9 in several superposed layers arranged in the aforesaid order. The partition wall 9 serves for the series connection of adjacent cells by direct surface contact of the electrodes of the cells engaging the partition walls. 10 and 11 are the press plates used as outer or end contact terminals and serving for increasing the stability of the block. Wedges 15 may be used between these plates and an additional casing or bandage 16 for increasing the contact pressure between the electrodes which is of high importance for attaining uniform surface distances between adjacent electrodes for ensuring a reliable retransformation of gas when overcharging the cells. Core pins 12 are inserted into the cast layer 5 for forming channels issuing into the separating layer of each cell. On removal of the core pin 12 a channel is formed as shown at 13 and this channel is afterwards closed with artificial material, preferably ethoxyline or epoxide resin, as shown at 14, after the treatment of the single cells required for ensuring reliable operation, as herein before described.

The multi-cell block shown in Fig. 4 is inserted in an additional casing 16 in order to increase its stability and more particularly in order to produce a surface pressure in the direction of the arrows and cast with artificial resin under action of a proper surface pressure, i.e. under preliminary tension, so that it forms a stable unit.

The layer 5 of artificial material forming the casing in which the edges of the partition wall sheets 1 are embedded, simultaneously forms a tightly covering layer of artificial material, preferably ethoxyline or epoxide resin, which is nonpermeable to ions and gas, on the cut surfaces of the electrodes, whereby it is ensured that these electrode surfaces cannot participate in the development of gas in the tightly closed accumulator casing.

While the invention has been described in detail with respect to a certain now preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. A multi-cell alkaline storage battery of the type consisting of a tightly sealed plastic casing which encloses a plurality of storage battery cells in series, each of which cells contains one each of thin sintered skeletal plate electrodes of opposite polarity and a separator between the adjacent electrodes of opposite polarity, adjacent electrodes of adjacent cells having opposite polarity with respect to each other, and having a sheet metal partition between each two adjacent cells which sheet metal partition is in contact with the adjacent electrodes of said two adjacent cells and constitutes a series connection between the latter cells, characterized in that said partition is a metallic sheet which protrudes on all sides beyond the adjacent electrodes between which it lies and in that the protruding portions of said partition are roughened and provided with a coating of synthetic material which engages and is fused into the plastic of the storage battery casing, said coating material forming with the plastic of said casing a gas- and solution-tight joint for effecting separation of the cells from one another.

2. An alkaline accumulator as per claim 1, in which a metallic powder material is applied on the projecting portions of said partition by sintering, so as to produce a rough surface.

3. An alkaline accumulator as per claim 1, in which the skeleton of the electrodes consists of highly porous sintered foil.

4. An alkaline accumulator as per claim 1, in which the synthetic coating material is non-permeable to ions and gas and is a member of the group consisting of ethoxyline and epoxide resin.

References Cited in the file of this patent

UNITED STATES PATENTS

| | | |
|---|---|---|
| 401,953 | Kookogey | Apr. 23, 1889 |
| 429,912 | Hering | June 10, 1890 |
| 2,379,374 | Payne | June 26, 1945 |
| 2,534,336 | Cahoon | Dec. 19, 1950 |
| 2,727,079 | Chubb et al. | Dec. 13, 1955 |

FOREIGN PATENTS

| | | |
|---|---|---|
| 500,655 | Canada | Mar. 16, 1954 |

OTHER REFERENCES

Abstract from appl. 194,002, Jan. 13, 1953.